(No Model.) 2 Sheets—Sheet 1.

F. H. RICHARDS.
BEARING FOR WEIGHING MACHINES.

No. 568,582. Patented Sept. 29, 1896.

Witnesses:
H. Mallner
Henry L. Reckard.

Inventor:
Francis H. Richards (No Model.) 2 Sheets—Sheet 2.
F. H. RICHARDS.
BEARING FOR WEIGHING MACHINES.
No. 568,582. Patented Sept. 29, 1896.
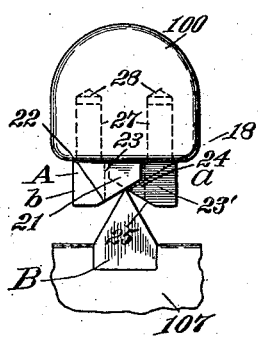
Fig. 5
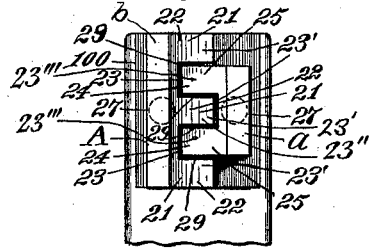
Fig. 6
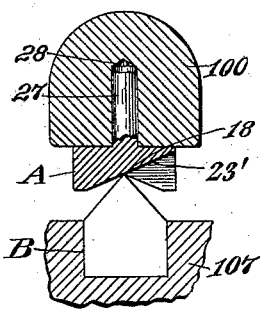
Fig. 13.
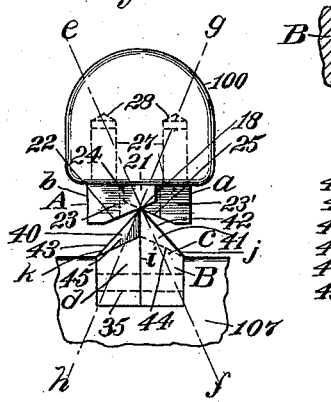
Fig. 7
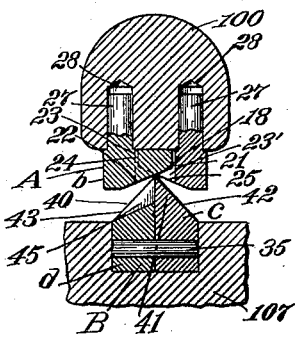
Fig. 8
Fig. 14.
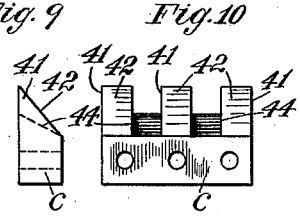
Fig. 9  Fig. 10
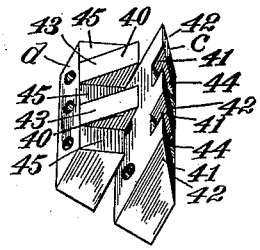
Fig. 12
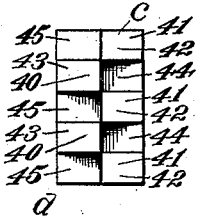
Fig. 11
Witnesses:
H. Mallner
Henry L. Reckard
Inventor:
Francis H. Richards

UNITED STATES PATENT OFFICE.

FRANCIS H. RICHARDS, OF HARTFORD, CONNECTICUT.

BEARING FOR WEIGHING-MACHINES.

SPECIFICATION forming part of Letters Patent No. 568,582, dated September 29, 1896.

Application filed February 24, 1896. Serial No. 580,393. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Bearings for Weighing-Machines, of which the following is a specification.

This invention relates to bearings for the scale-beams of weighing-machines; and the object of the invention is to provide an improved bearing means adapted to secure the accurate poising, while freely permitting the oscillatory movements, of the beam, and by means of which the beam will be positively restrained against lateral movement, and in which the pivotal member of the bearing will automatically adjust itself to find its true bearing position throughout the entire operation of the device.

Figure 1:
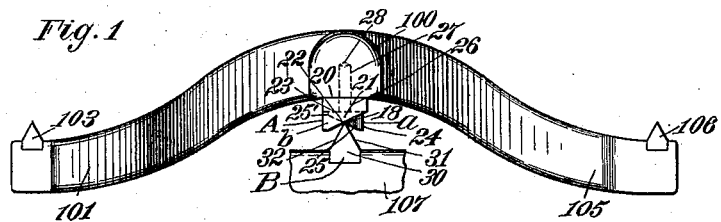
Figure 2:
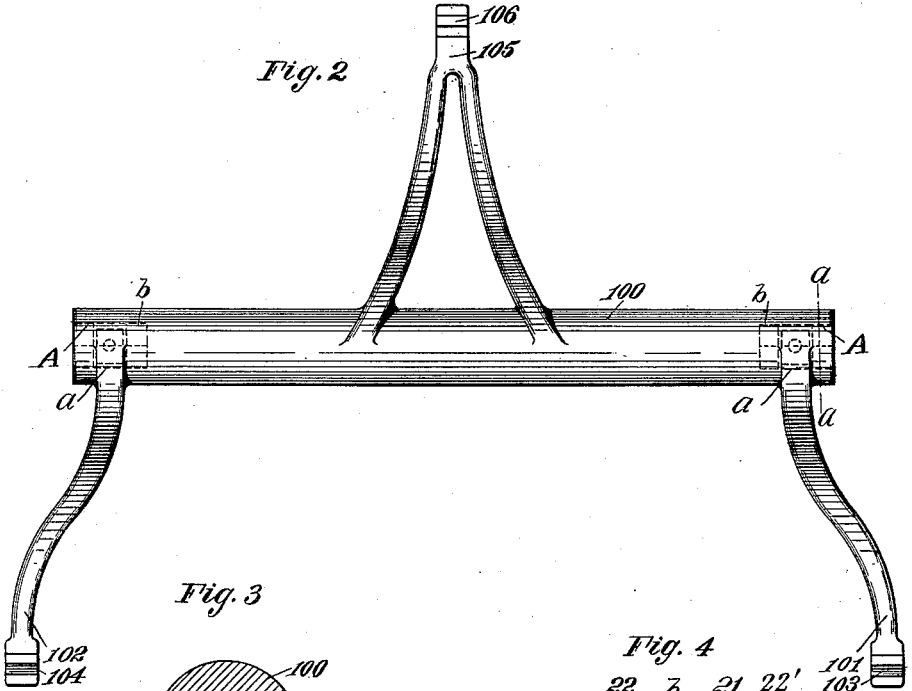
Figure 3:
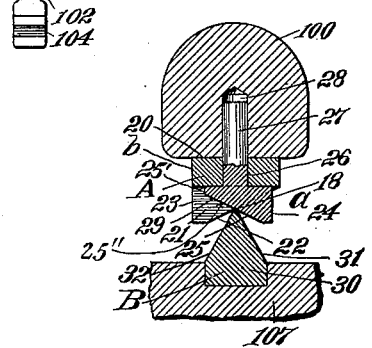
Figure 4:
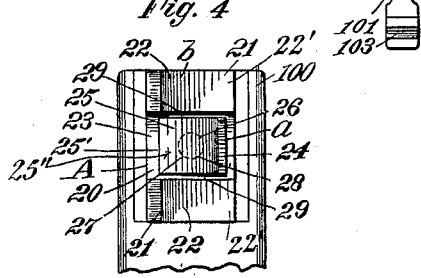

In the drawings accompanying and forming part of this specification, Figure 1 is an end elevation of one construction of a scale-beam of a weighing-machine having one form of this improved bearing secured thereto. Fig. 2 is a top view thereof, showing the bearings in dotted lines adjacent to each end of the beam. Fig. 3 is a cross-sectional view on line *a a*, Fig. 2, for more clearly illustrating one form of this improved bearing and one means of securing the same to a scale-beam. Fig. 4 is bottom view of the bearing member shown in Fig. 3, the scale-beam being broken away. Fig. 5 is an end view of a scale-beam, showing another form of bearing secured thereto. Fig. 6 is a bottom view of the bearing member thereof with the scale-beam broken away. Fig. 7 is an end view of a scale-beam, showing another form of bearing in operative connection therewith. Fig. 8 is a transverse sectional view of the construction shown in Fig. 7 and more clearly illustrates another means of securing the bearing member in position. Fig. 9 is an end view of one member of the pivot or pivot member of the bearing. Fig. 10 is a front view thereof. Fig. 11 is a top view of the pivot or pivot member. Fig. 12 is a perspective view thereof, showing the members slightly separated.
Fig. 13 is a cross-sectional view of a scale-beam and illustrates the bearing member secured thereto and constructed in one piece, and Fig. 14 is a perspective view of a pivot or pivot member also shown constructed in one piece.

Similar characters of reference designate like parts in all the figures of the drawings.

It will be understood that this improved bearing can be used not only to support the scale-beam of a weighing-machine, but also, if desired, in connection with the mechanism usually carried by such scale-beam, and it can also be used in connection with apparatuses or devices other than weighing-machines where a bearing means of this character is required. It will furthermore be understood that either the bearing member or the pivot member may be the oscillatory member and be secured to the scale-beam or other rocking member for movement therewith, as desired; but for convenience of description and illustration I have shown this improved bearing means in connection with one form of scale-beam of a weighing-machine and have shown the bearing member as the oscillatory member, and hence have shown the same secured to the beam or rocking member for movement therewith, and in which structure 100 designates a scale beam or shaft, of any suitable construction, having the usual bucket-carrying arms 101 and 102, provided with the knife-edge pivots 103 and 104, secured adjacent to the outer ends thereof in any preferred way, and having the weight-supporting arm 105, likewise of any desired construction, oppositely supported on said beam or shaft relatively to the arms 101 and 102, and also carrying a knife-edge pivot 106, secured adjacent to the outer end thereof in any desired manner. The scale-beam or rocking member 100 is supported on the framework 107 by the improved bearing means hereinafter described. It will be understood, however, that the scale-beam or other rocking member forms no part of this invention, except so far as the same is necessary for the proper operative connection thereto of this improved bearing means.

In the bearings of weighing-machines as heretofore constructed the ordinary knife-edge pivot is without any effective control in a direction laterally of such knife-edge, owing to the impracticability of constructing, by the tools ordinarily in use, the bearing member— which is usually a substantially V-shaped member—with its inclined faces terminating in a sharp vertex or angular point, and therefore such vertex or angular point in the ordinary construction of bearing member is slightly curved or rounded, and in the operation of the device, owing to the action of the knife-edge therein, such member becomes slightly more curved at its vertex, so that lateral movement of the oscillatory member of the bearing means is permitted and the accuracy of the device thereby impaired, whereas by this improved construction of bearing means not only can the angular points or vertex of the bearing member be made sharp and without curve, so that the pivot member will be, in effect, a journal having a minimum of possible diameter, but such pivot member will at all times automatically find its true bearing position and be maintained in such position. Furthermore, in bearings as heretofore constructed, when employed for weighing grain or pulverulent material, dust and other fine particles are apt to settle and become lodged and packed into a hard and rigid mass at the poising-points of such bearings, and especially is this so unless said bearings are kept perfectly clean and dry and free from moisture, which is not always practicable, so that when dust or other foreign particles settle in the socket of the bearing member adjacent to the apex of the usual conical point or knife-edge the continued movement of the bearing member packs and crowds the same therein to such an extent as to form an interposed bearing of such material, which permits the lateral movement of the bearing member relatively to its knife-edge, thereby effecting the delicacy of the balance and frequently throwing the poising-point out of its true position, and hence one of the advantages of this improved bearing means is that in operation it will automatically free or clear itself from foreign particles, and thus prevent at all times the packing thereof and thereby secure accuracy of movement of the members of such bearing.

In the preferred form thereof herein shown and described this improved bearing means comprises, in a general way, a bearing member or block (designated generally by A) formed of one or more members having oppositely-inclined bearing walls or faces in alternation with each other, and also having recesses at each side of such inclined walls or faces, also in alternation with each other, and a pivot or pivot member (designated in a general way by B) constructed of one or more members having oppositely-inclined solid faces or walls, or in its preferred form having one or more inclined faces or walls at one side of its apex in alternation with one or more inclined walls or faces at its opposite side, whereby recesses, also in alternation with each other, are formed at each side of said inclined faces or walls.

According to one form of this improved pivotal connection, Figs. 1 to 4, the bearing member or block A comprises two members $a$ and $b$, the member $b$ of which preferably comprises a suitable base 20, provided with projections 21 in the nature of wedges adjacent to each end thereof, and which have inclined bearing walls or faces 22, said walls or faces being inclined in the same direction and having a recess 23 intermediate thereof, and the member $a$ preferably comprising a similar projection 24, also in the nature of a wedge having an inclined bearing face or wall 25 and adapted to be seated intermediate of the projections 21 of the member $b$, with its inner end 25' in the recess 23, whereby said member $a$ will have its inclined face or wall 25 crossing the inclined plane of the face or wall 22 of the member $b$, and thereby form a substantially V-shaped bearing member or block A, having the alternately-inclined bearing walls or faces 22 25 and recesses 22' and 25'' and the sharp non-curved vertex 18, said recesses 22' being formed at each side adjacent to the largest part of the projection 24 by the relatively small ends of the projection 21, and recess 25'' being formed intermediate of the largest parts of the projections 21 by the relatively small end of the projection 24, so that in the construction shown a series of three recesses 22' and 25'' are formed, alternating with each other and with the three extending projections 21 and 24. In other words, owing to the small end of each wedge-shaped projection, a recess is formed at each side adjacent to the largest part of its companion projections. As one means for securing these members in operative position relatively to each other and to the scale-beam, the member $b$ is provided with an aperture 26 in the base portion 20 thereof, intermediate of its projections 21, and the member $a$ is provided with a stem or spindle 27, projecting through said aperture 26 and into a recess 28 of the scale-beam, and in which aperture 26 and recess 28 said member $a$ is loosely held, whereby it is adjustable relatively to the member $b$, so that the pivot member will be permitted to always find its true bearing position at the vertex of the inclined faces or walls of the bearing member, and which adjustability is permitted by seating the projection 24 of the member $a$ between the members 21, with a slight space, as 29, at each side thereof.

In the form of pivot or pivot member B shown in Figs. 1 to 4, inclusive, the same is constructed of a solid member 30 in the nature of a knife-edge pivot, having the oppositely-inclined faces 31 and 32 and secured to the framework 107 of the weighing-machine in any desired way, and on the apex of which the bearing member or block A rests in a manner that will be obvious from the above description.

By constructing the bearing member A with alternately-inclined faces and recesses the walls or faces of the projections 21 and 24 can be milled or planed to form a perfect inclined plane face, so that when said members *a* and *b* are in interlocked position they will form a bearing member having a sharp true vertex from end to end thereof, and without the usual curved or rounded surface as such vertex.

In the use of this improved bearing means lateral movement of the bearing member A relatively to the pivot member B is prevented, as the knife-edge becomes, in effect, a journal having a minimum of possible diameter, and the bearing members will automatically adjust themselves to permit the knife-edge to have its true bearing position from end to end of said members at the vertex thereof, as will be obvious without a further description, and the foreign particles, which frequently become packed or caked between the usual solid inclined faces or walls of the ordinary bearing-block and knife-edge pivot adjacent to the apex thereof, in this construction not only find less surface upon which to settle, owing to the recesses, but are forced or pushed away from the inclined faces or walls of the bearing member, owing to the alternately-inclined walls or faces and recesses of said member—that is to say, on the oscillation of the bearing member the foreign particles, settling between the inclined faces or walls 21 of the member *b* and the inclined face 32 of the knife-edge adjacent thereto, will be forced or pushed over the sides of the relatively narrow walls or faces 21 both at the ends of the member *b* and into the recess 23 intermediate thereof, the same action taking place at the opposite side of the pivot member, and thus the caking and packing of the foreign particles prevented.

In the form of pivotal connection shown in Figs. 5 and 6 the member *b*, forming a part of the bearing member A, is provided with a series of projections 21, having inclined bearing faces or walls 22, and recesses 23, alternating with a series of projections 24, also having inclined bearing faces or walls 25 and an intermediate recess 23″ of the member *a*, said members *a* and *b* interlocking with each other and thus forming the bearing member A, one member of which will, in the construction shown, have three inclined bearing faces or walls 22 and two recesses 23, and the other member thereof will have two inclined bearing faces or walls 25 and one intermediate recess 23″, whereby three recesses 23′ are formed at each side adjacent to the largest part of the projections 24 of the member *a* by the small ends of the projections 21, and two recesses 23‴ are formed at each side adjacent to the largest part of the projections 21 of the member *b* by the small ends of the projections 24, so that in this construction a series of five alternating recesses 23′ and 23‴ are formed, alternating with each other and with five alternating projections 21 and 24. In this construction each member forming the bearing member A is preferably independently secured to the scale-beam, and by the means herein shown therefor each member is provided with a stem 27, extending into a suitable recess 28 in the beam and loosely held therein, whereby the members are adjustable relatively to each other to permit the knife-edge pivot to automatically find its true bearing position at the vertex of the bearing member, from end to end thereof, and which adjustability is obtained by forming a slight space 29 between the sides of the projections 21 and 24. In this construction the pivot member is substantially similar to that described in the construction shown in Figs. 1 to 4, and the operation of the device is likewise similar.

In the construction shown in Figs. 7 to 12, inclusive, the bearing member or block is preferably secured to the beam and constructed with the same number of inclined alternating bearing walls or faces as the bearing member shown in Figs. 5 and 6; but the members *a* and *b* thereof are interlocked at a somewhat different angle in order to permit a blunter knife-edge-pivot member to be used, whereby the edge thereof will be more durable and less liable to break off in the operation of the device. The pivot member, however, which is disposed and held in position relatively to the framework 107 of the machine in any suitable and desired manner, is shown in this construction preferably comprising two members *c* and *d*, secured together by any suitable means, such, for instance, as studs or bolts 35, and forming a knife-edge pivot. Each of these members *c* and *d* has a series of alternating projections 40 and 41, respectively, having inclined faces or walls 42 and 43 and recesses 44 and 45, corresponding in number with the projections and recesses of the bearing member the faces or walls 42 of the member *c* being inclined in a direction opposite to the faces or walls 43 of the other member, *d*, and in alternation therewith. The apex of the pivot member B, however, will form an unbroken and continuous bearing-face for the bearing member A from end to end of said pivot member.

It will be understood that in each of these constructions, instead of having the bearing member or block and the pivot member composed of separable members, the same result may be obtained by constructing the same in one piece, if desired, Figs. 13 and 14, by forming the recesses in said members in any suitable way and thereby permitting the inclined walls to be formed in true inclined planes, which in the bearing member will cross each other to form the sharp vertex 18, and in the pivot member will form a true continuous and sharp bearing edge from end to end of the member. In the construction shown in Fig. 13, however, the bearing member will not have parts thereof adjustable relatively to each other, but owing to the true incline of the walls or faces and the sharp vertex thereof the pivot member will always find its true bearing position in the vertex of said bearing member, and as the bearing member A will preferably be secured in position by means of a pivot 27, extending into a recess 28 of the scale-beam or other supporting device, when two or more are used in alinement with each other one bearing member will automatically adjust itself relatively to the other bearing member to thereby permit the knife-edges to automatically find their true bearing positions.

By the construction shown in Figs. 7 to 14, inclusive, the pivot member is adapted to be set vertical to the bearing member, whereby the inclined face or wall of each part $a$ and $b$ of the bearing member A will be at right angles to such knife-edge-pivot member B—that is to say, referring more particularly to Fig. 7, the inclined face 22 of the member $b$ of the bearing is at right angles to the dotted line $ef$, formed centrally of the perpendicular face $i$ and inclined face $j$ of the member $c$ of the pivot, and the inclined face 25 of the opposite member $a$ of the bearing is at right angles to the dotted line $gh$, formed centrally between the perpendicular face $i$ and inclined face $k$ of the other member $d$ of the pivot, whereby the pivot member will be vertical to the bearing member, and thereby permit a blunter but sharp edge, and hence more durable knife-edge pivot to be used without the liability of breaking such edge off, and to also permit each part of the bearing member to be supported directly upon the edge of the pivot member at right angles to such pivot member, and thereby obtaining all the advantages of a construction in which one part is supported directly at right angles to another part rather than at a different angle, and hence indirectly thereon.

In the construction shown in Figs. 7 to 14 the caking and packing of foreign particles is likewise prevented in the same manner as that set forth in connection with Figs. 1 to 6, and also for an additional reason that as each inclined face of the pivot member is opposite to a recess of the bearing member, and vice versa, there is no surface upon which the dust or particles can settle and become packed or caked.

From the foregoing description it will be obvious in these improved bearings that the bearing members thereof, whether formed as seperable members or in one piece, will have, owing to their construction, their inclined faces formed in a true plane, to thereby form a sharp non-curved vertex for the pivot member, and whereby lateral movement of the bearing member relatively to the pivot member is prevented, and whereby also, when the members are secured in position, the pivot member will be permitted to automatically adjust itself throughout the entire movement of the bearing member and its beam, to thereby find its true bearing position at all times. It will also be obvious that in the construction of pivot members shown in Figs. 7 to 14, whether formed of separable members or in one piece, a true continuous and sharp bearing edge will be formed from end to end thereof, whereby such edge will engage the vertex of the bearing member from end to end thereof. It will also be understood that the bearing member and the pivot member may have any desired number of projections having inclined faces or walls and recesses at the sides thereof, those of the bearing member in practice preferably corresponding with those of the pivot member, and vice versa.

It will be understood that any suitable means other than that shown may be employed to secure the parts of the bearing members in position and to the scale-beam, so that the same can be adjustable relatively to each other, and in the construction shown in Figs. 5 to 8, if desired, one member may lock or clamp the other member thereof in position in substantially the same manner as described in connection with the construction shown in Figs. 1 to 4.

It will be obvious that the construction of the bearings may be widely varied from what is herein shown and described, and that, therefore, my invention is not limited in its scope, but comprehends, broadly, any means whereby the balancing-points of scale or other machines or devices will automatically find their true bearing positions and be positively restrained against lateral movement.

Having thus described my invention, I claim—

1. A bearing comprising a bearing member having oppositely-inclined bearing-faces alternating with each other, and a pivot member supporting the same.

2. A bearing comprising a bearing member having recesses and inclined bearing-faces alternating with each other; and a pivot member supporting said bearing member.

3. A bearing for a scale-beam or other device, comprising a bearing member having recesses and inclined bearing-faces alternating with each other; means for adjustably securing said bearing member to said scale-beam; and a pivot supporting said bearing member, and thereby the scale-beam.

4. In a bearing for a scale-beam, the combination of a bearing member having oppositely and alternately disposed inclined bearing-faces; means for securing said bearing member to said scale-beam; and a pivot supporting said bearing member, and thereby the scale-beam.

5. A bearing comprising a bearing member, and a pivot member supporting the same, one of said members having recesses and inclined walls or faces disposed in alternation.

6. A bearing comprising two members, one supporting the other, and one of said members having one or more recesses and oppositely-inclined walls or faces disposed in alternation.

7. In a bearing, the combination of a V-shaped bearing member, and a knife-edgepivot member supporting the same; both of said members having a recess and an inclined face adjacent to each side of its vertex and in alternation with each other.

8. A bearing comprising two members, one supporting the other, and one of said members comprising a plurality of parts, each part normally freely adjustable in a horizontal plane relatively to the other part thereof or in a plane transverse to the plane of movement of the oscillatory or movable member of the bearing, whereby the members comprising said bearing will always find their true bearing position relatively to each other.

9. A bearing comprising a bearing member consisting of two separable parts adjustable in a horizontal plane relatively to each other, each of said parts having an inclined bearing-face; and a pivot supporting said bearing member.

10. A bearing comprising a bearing member consisting of separable members; each of said members having an inclined bearing-face; and one of said members having an aperture, and the other of said members having a stem extending therethrough, to secure said members together and to the bearing-member-carrying means; and a pivot member supporting said bearing member.

11. A bearing comprising a separable bearing member, one of the parts of said bearing member having a base, and projections having inclined bearing-faces and an aperture extending through said base intermediate of said projections, and the other part thereof having a projection with an inclined bearing-face, and a stem adapted to extend through said aperture to secure said members adjustably together and to the bearing-member-carrying means; and a pivot supporting said bearing member.

12. A bearing comprising a bearing member consisting of two separable and adjustable parts; means for securing each of said parts in position relatively to each other and to the bearing-member-supporting means or scale-beam, whereby said parts will be horizontally adjustable relatively to each other; and a pivot member on which said bearing is movable.

13. In a bearing, the combination of a V-shaped bearing member consisting of two separable parts; each of said parts having one or more inclined bearing-faces and one or more recesses in alternation with each other, whereby an inclined face of one part will be in alternation with an inclined face of the other part; and a knife-edge-pivot member supporting said bearing member.

14. In a bearing, the combination of a bearing member consisting of two separable parts, and a pivot member supporting said bearing member; one of said members having recesses and inclined faces alternating with each other.

15. A bearing comprising two members, one supporting the other, and one of said members consisting of separable parts, each of said separable parts having an inclined face and a recess in alternation with the inclined face and recess of the other separable part.

16. In a bearing, the combination of a V-shaped bearing member and a V-shaped pivot member; one of said members consisting of two separable parts, each separable part having an inclined face and a recess; and means for securing said separable parts in position relatively to each other.

17. A bearing comprising a V-shaped bearing member and a knife-edge-pivot member; one of said members consisting of separable parts, and each of said parts having an inclined face and a recess in alternation with the inclined face and recess of the other part.

18. A bearing comprising a bearing member and a pivot member, one of said members consisting of separable parts, and one of said members having inclined faces and recesses in alternation with each other.

19. A bearing comprising a bearing member and a pivot member, one of said members consisting of separable parts, and both of said members having inclined faces and recesses disposed in alternation.

20. A bearing comprising a bearing member consisting of separable parts, and a pivot member also consisting of separable parts and adapted to support the bearing member.

21. A bearing comprising a bearing member consisting of separable parts, each part having an inclined bearing-face in alternation with the inclined bearing-face of the other part thereof; and a pivot member also consisting of separable parts, and each part having an inclined face in alternation with the inclined face of the other part thereof.

22. A bearing comprising a bearing member; consisting of separable parts, each part having an inclined bearing-face and a recess in alternation with each other; and a pivot member also consisting of separable parts, each part also having an inclined face and a recess in alternation with each other; and the inclined bearing-faces of the bearing member alternating with the inclined faces of the pivot member.

23. A bearing comprising a bearing member consisting of separable parts having oppositely-inclined bearing-faces, and a pivot member also consisting of separable parts having oppositely-inclined faces and having each part thereof set vertically to an inclined face of the bearing member.

24. A bearing comprising a bearing member consisting of separable parts, each part having an inclined bearing-face and a recess in alternation with the inclined face and recess of the other part thereof; and a pivot member also consisting of separable parts, each part having an inclined face and a recess in alternation with the inclined face and recess of the other part thereof, said inclined faces of the bearing member being opposite to the recesses of the pivot member; and the pivot member having each part thereof disposed vertically to an inclined face of the bearing member.

25. A bearing consisting of a bearing member comprising two members adjustable in a horizontal plane relatively to each other, and a pivot member bearing on and automatically adjusting said bearing members relatively to each other.

26. A bearing comprising two members, one supporting the other, and one of said members comprising two parts, each normally freely adjustable in a horizontal plane relatively to the other part thereof or in a plane transverse to the plane of movement of the oscillatory or movable member of the bearing, whereby the members of said bearing will always find their true bearing position relatively to each other, and each of said normally freely adjustable parts having an inclined, true, plane bearing-face crossing the inclined, plane bearing-face of the other part thereof to form a sharp, non-curved vertex.

27. A bearing member having one or more recesses and a plurality of opposite inclined plane bearing-faces alternating with each other.

28. A bearing member comprising two separable parts having oppositely-inclined, true, plane bearing-faces, each part thereof normally freely adjustable in a horizontal plane relatively to the other part thereof or in a plane transverse to the inclined faces thereof.

29. A pivot member consisting of two separable members, each of said members having oppositely-inclined faces or walls.

30. A pivot member having oppositely-inclined plane bearing-faces alternating with each other.

31. A pivot member having alternating recesses and oppositely-inclined bearing-faces alternating with each other and with said recesses.

32. A bearing comprising two members, one supporting the other, and both of said members having one or more recesses and oppositely-inclined walls or faces disposed in alternation.

FRANCIS H. RICHARDS.

Witnesses:
    FRED. J. DOLE,
    HEATH SUTHERLAND.